United States Patent [19]

Dover et al.

[11] Patent Number: 5,567,474

[45] Date of Patent: Oct. 22, 1996

[54] PROCESS FOR PRODUCING ALKALI METAL DISPERSIONS

[75] Inventors: B. Troy Dover, Kings Mountain; Conrad W. Kamienski; Robert C. Morrison, both of Gastonia; R. Thomas Currin, Jr., Salisbury, all of N.C.

[73] Assignee: FMC Corporation, Philadelphia, Pa.

[21] Appl. No.: 210,840

[22] Filed: Mar. 21, 1994

Related U.S. Application Data

[63] Continuation-in-part of Ser. No. 19,006, Feb. 18, 1993, abandoned.

[51] Int. Cl.$^6$ ............................ B01J 13/02; B32B 15/02; C23C 8/16
[52] U.S. Cl. .................... 427/213.3; 252/182.32; 252/309; 252/314; 427/216; 428/402.24; 428/403
[58] Field of Search ........................ 252/182.32, 304, 252/314; 427/216, 213.3

[56] References Cited

U.S. PATENT DOCUMENTS

| | | | |
|---|---|---|---|
| 2,058,503 | 10/1936 | Rafton et al. | 252/303 X |
| 2,394,608 | 2/1946 | Hansley | 252/309 |
| 2,798,831 | 7/1957 | Willcox | 252/309 X |
| 2,918,435 | 12/1959 | Warner | 252/309 |
| 2,930,712 | 3/1960 | Homer et al. | 427/216 X |
| 3,197,516 | 7/1965 | Esmay et al. | 252/309 X |
| 3,580,862 | 5/1971 | Watson et al. | 252/309 |
| 4,132,666 | 1/1979 | Chikatsu et al. | 252/309 |
| 4,671,211 | 6/1987 | Buford | 427/216 X |

OTHER PUBLICATIONS

Z. H. Kafafi, et al., J. Am. Chem. Soc., 105, 3886 (1983).
D. J. David, et al., in Applications of Surface Science, 7, (1981), 185–195.
P. A. Lindfors, et al., Microbeam Analysis, 303–308 (1981).
M. M. Markowitz, et al., in J. Chem. Eng'g. Data 7 (1962) 586–591.

*Primary Examiner*—Richard D. Lovering
*Attorney, Agent, or Firm*—Charles C. Fellows; Robert L. Andersen

[57] ABSTRACT

A process for producing alkali metal dispersions by agitating a mixture of molten alkali metal in a hydrocarbon oil at dispersion speeds by contacting the dispersed alkali metal with up to 3 weight percent anhydrous carbon dioxide through the agitating dispersion for at least 1 minute. The process produces lithium dispersions having a dispersion coating containing lithium carbonate, lithium oxide or hydroxide and a hydrocarbon.

4 Claims, No Drawings

PROCESS FOR PRODUCING ALKALI METAL DISPERSIONS

This application is a continuation-in-part of U.S. Ser. No. 08/019,006 filed Feb. 18, 1993, now abandoned.

This invention concerns a process for preparing alkali metal dispersions by melting an alkali metal in a liquid medium, agitating the molten metal under dispersion conditions to produce a dispersion followed by contacting the dispersion with carbon dioxide.

Dispersions of alkali metals in inert solvents provide a preferred way to introduce the metals into a reaction since it is easy to control the rate of addition and to control the reaction.

Conventional processes prepare alkali metal dispersions by melting the alkali metal in a hydrocarbon oil and then agitating the molten metal in an inert hydrocarbon oil at dispersion speed in an inert atmosphere, usually argon. Dispersing aids, such as silicon oils, ethers, organic acids, carbon black, organic salts and so forth are used to facilitate rapid dispersion of the molten metal and development of uniform particle size. The finished dispersion is cooled, separated from the hydrocarbon oil and stored under argon. Unless stored under argon or some other inert, protective medium these alkali metal dispersions, when dry, react with the atmosphere under ambient storage conditions and there will be a loss of reactivity and danger of ignition. The separated hydrocarbon oil is purified by passing it though a dry clay column for recycle to the dispersion process. One process forces molten alkali metal and argon through a spray nozzle into hexane. The book "*Alkali Metal Dispersions*" by Irving Fatt and Marie Tashima, contains conventional dispersion process details and lists numerous dispersing aids.

In accord with the present invention lithium and sodium dispersions in hydrocarbon oil are readily prepared by heating to above the melting point of the metals, vigorously agitating the molten metal hydrocarbon oil mixture to produce dispersion conditions, for sufficient time to produce a dispersion, for example stirring vigorously at dispersion speeds for several minutes, then according to the invention, contacting the dispersed metal with anhydrous carbon dioxide ($CO_2$). The anhydrous carbon dioxide is added to the dispersion mixtures until 0.3–3 weight percent carbon dioxide on alkali metal has been introduced into the mixture. While carbon dioxide is preferably introduced below the surface of the mixture the vigorous agitation conditions necessary to produce dispersions are generally adequate to result in contacting carbon dioxide introduced above the dispersion mixture with the dispersed metal. The amount of carbon dioxide introduced should be at least 0.3 weight percent based on the metal and 1–3 weight percent is preferred. Higher levels of anhydrous carbon dioxide can be employed but do not appear to provide additional advantages. Some minimum contact time between the carbon dioxide and metal is necessary, one minute seems adequate and 1 to 5 minutes a practical reaction period.

An advantage of the process is that dry carbon dioxide gas not only is a dispersing aid, the carbon dioxide unexpectedly reacts sufficiently with molten alkali metals in particulate form suspended in a hydrocarbon oil to form a dispersive coating around the metal particles, which, on cooling to ambient temperature and removal of the hydrocarbon oil medium, are relatively unreactive to the components of the atmosphere and can be transferred through such ambient atmospheres from one container to another without danger of ignition or loss of activity. Conventionally produced alkali metal powders exposed to the ambient atmosphere are well known to react, losing activity and in the case of sodium occasionally igniting.

The process produces alkali metal dispersions having metal particle sizes in the range of 10 to 300 microns. On cooling, the resulting alkali metal dispersions are readily filtered to remove the bulk of the dispersant hydrocarbon oil and the metal can then be washed with hexane to remove residual oil, after which, the metal powder can be dried. The hydrocarbon oil filtrate is clear and colorless and may be recycled, without further treatment, to the metal dispersion process in contrast to the prior art processes which require clay column purification of the oil before reuse. Surprisingly, the dried metal powders are unexpectedly stable to ambient atmosphere for periods up to about an hour allowing their safe transfer in such atmospheres from one container to another. The surface coating on the lithium metal powders produced has been found by X-ray photoelectron spectroscopy (XPS) to be a mixture of lithium carbonate and lithium oxide (or lithium hydroxide) and hydrocarbon (hydrocarbon oil). One lithium metal powder was found to have a (Li:C:O atomic ratio in the order of 1:1:1). These lithium and sodium powders have been found to be non-pyrophoric. Surprisingly, the dried sodium powders when exposed to the atmosphere do not react with the atmosphere in the usual way producing a lot of heat and occasionally igniting.

The metal powders of this invention can be dried and packaged in suitable containers under an inert atmosphere, such as argon. The powders can easily be introduced into commercial or laboratory reactions as dry powders or slurried in an inert solvent and introduced into the reaction as a slurry. If desired, the coating on the metal powders can be removed by washing the coated metal with solvent containing 1–3 weight percent isopropyl alcohol in the solvent or directly by addition of a small amount of isopropyl alcohol. The washed metal has a bright, clean, shiny appearance.

Dried lithium powders have been used to prepare a variety of organolithium products in good yields, among which are n-, sec-, iso and tert-butyllithiums, phenyllithium, n-hexyllithium, 2-ethylhexyllithium, and lithium diisopropylamide (see Table 1). It was found that n-butyllithium could be prepared in an 82% yield from such a lithium powder that had been exposed to an ambient atmosphere for a 1 hour period. Lithium powder which was protected from ambient conditions and stored under argon for 30 days, produced high yields of n- and sec-butyllithium produced from it. Yields of n- and sec-butyllithium produced from lithium powders stored under argon are generally in the 85–95% range in yield.

It was unexpectedly found that the coating on the metal particles produced by the process of this invention does not retard the reactivity of the metal with alkyl halides, but does protect the metal from reaction with the ambient atmosphere. This is an advantage of producing metal dispersions by the process of this invention since ordinarily reaction with the ambient atmosphere retards the reactivity of a metal with alkyl halides.

A variety of hydrocarbon oils, may be used successfully in the present invention. The term hydrocarbon oil, as used herein, includes various oily liquids consisting chiefly or wholly of mixtures of hydrocarbons and includes mineral oils, i.e., liquid products of mineral origin having viscosity limits recognized for oils and hence includes but is not limited to petroleum, shale oils, paraffin oils and the like. There are many manufacturers of these useful hydrocarbon oils.

Among these useful hydrocarbon oils are white oils (highly refined), such as, e.g. hydrocarbon oils like Peneteck manufactured by Penreco Division of Pennzoil Products Inc., which has a viscosity in the range of 43–59 pascal-sec at 100° F. and a flash point of 265° F. (129° C.), and Parol 100, which has a viscosity of 213–236 pascal-sec at 100° F. and a flash point of 360° F. (182° C.). (available from Penreco, Div. of Pennzoil Products) and Carnation white oil (viscosity=133–165 pascal-sec at 100° F.; flash pt=177° C.) made by Sonneborn Div. of Witco. Even certain purified hydrocarbon solvents which boil in a range encompassing the melting point of lithium or sodium metal may be used, such as UNOCAL's 140 Solvent (b.p. range=190°–203° C.). In addition, unrefined oils, such as Unocal's 460 Solvent (b.p. range 189°–262° C.) and Hydrocarbon Seal oil (b.p. 270°–321° C.) and Exxon's Telura 401 (b.p. 174°–322° C.) and Telura 407 (b.p. 245°–450° C.) may also be used. The specific hydrocarbon oil selected does not appear to be critical.

Effect of CARBON DIOXIDE Dispersed Lithium on Final Chloride Content

Table 2 lists some results of the use of carbon dioxide dispersed lithium dispersions in Peneteck Oil in preparing n- and sec-butyllithium in hydrocarbon solvents. Of particular interest is the last column showing the level of inorganic chloride ion dissolved in the alkyllithium solution after filtration. Compared to typical oleic acid dispersions of lithium, carbon dioxide based lithium dispersions generally produce alkyllithium solutions with a lower soluble inorganic chloride content. Such low inorganic chloride levels indicate a greater extent of completion of the reaction between alkyl chloride and lithium metal. The trend is toward lower chloride levels the less carbon dioxide is used in the dispersion preparation. Lower chloride levels are associated with clearer product alkyllithium solutions which have enhanced marketability.

Sodium in Lithium

Generally, it has been found that, when oleic acid is used as the dispersing agent in preparing lithium dispersions, the levels of sodium incorporated in the lithium must be kept below the alloy composition, i.e., below 0.88 wt %, in order to prevent thickening or gellation of the dispersion mass. With the substitution of carbon dioxide for oleic acid, there is no practical upper limit for sodium incorporation. For example, Table 2 shows a 5 weight sodium incorporation, based on lithium, which has no tendency to thicken. Of course, carbon dioxide can be employed with conventional dispersing agents such as oleic acid.

The following examples further illustrate the invention.

EXAMPLE 1

Lithium Dispersion in Peneteck White Hydrocarbon Oil Using Carbon Dioxide (Surface FED) as Dispersing Agent Experiment No. 7285

Procedure

Lithium metal 300 g of low sodium grade was charged to a 3 liter stainless steel resin flask reactor with a 4" (10.16 cm) top fitted with a stirring shaft connected to a fixed high speed stirrer motor with a flexible shaft and top and bottom heating mantles in a dry atmosphere room under argon. The reactor was then assembled and 2.25 g of sodium metal and 90% g of Peneteck™ hydrocarbon oil were added. Peneteck hydrocarbon oil is a product of Penreco Division of Pennzoil Products Co. The reactor was then heated to 200° C. until the lithium and sodium metals became molten. Stirring was maintained gently and intermittently until all the metal was completely molten. Then the mixture was stirred at high speed (10,000 rpm) for 5 minutes. Carbon dioxide, 7.74 g, was charged, surface fed over a 4 minute period while continuing high speed stirring. The high speed stirring incorporated the carbon dioxide into the metal-hydrocarbon mixture.

When the carbon dioxide was all added the stirring was stopped, heating mantles removed and the reactor cooled to about 65° C. before bottling the product dispersion.

Details of further examples using the procedure of this example are given in Tables 3 and 4.

EXAMPLE 2

Preparation of Dry Lithium Powder

Experiment #7222

Lithium dispersion (lot 7218) prepared as in Example 1 above was filtered and washed in an enclosed, sintered glass filter funnel (fine porosity) to remove the hydrocarbon oil medium. Filtration to remove the bulk of the oil occurred rapidly, as did the subsequent hexane washings (3). Finally, the lithium metal residue in the funnel was washed once with n-pentane, filtered, and the funnel heated with a heat gun to remove traces of solvents. The resulting free-flowing powder was transferred from the funnel to a tightly capped storage bottle.

A pyroforicity test [Code of Federal Regulations 49 —Transportation Section 173.125 and Appendix E (CFR 49)] carried out on this material showed it to be non-pyrophoric.

An exposure test (Experiment #7231) carried out on a sample of this dry powder placed on a watch glass and exposed to ambient air conditions; no heat was generated on exposure to the air nor did any color change occur within 8 hours as occurs with normally prepared lithium dispersion powders. There was no odor of ammonia, either, as normally occurs due to nitridation of the metal.

EXAMPLE 3

Preparation of n-butyllithium in Hexane Using Carbon Dioxide Dispersed Lithium Metal Powder Previously Exposed to Ambient Air Experiment #7271

A lithium metal dispersion in Peneteck hydrocarbon oil prepared as in Example 1 with carbon dioxide (#7218) was filtered and the metal washed 3 times with hexane, once with n-pentane, and blown dry. A 9 gram (1.3 gram atoms) portion of this metal powder was placed in an open Petri dish and exposed to ambient air (80% relative humidity) for approximately one hour. It was then transferred to a reaction flask along with 164 mls of hexane and 5 cc of at 15 wt % n-butyllithium in hexane conditioner and stirred for about 20 min. before starting a feed to it of 54.6 g (0.584 moles) of n-butyl chloride. The reaction proceeded well and after 2 hours of post addition stirring, was filtered away from the by-product lithium chloride and the latter washed three times with a total of 120 mls of hexane. The filtrations proceeded rapidly to give a water white, clear solution of a 15 wt % solution of n-butyllithium in hexane (82.3% yield based on n-butyl chloride).

This experiment showed that there was a protective coating on the lithium metal powder sufficient to prevent any significant loss of lithium metal during transfer of the powder in air. (However, it is recommended that such transfer be made in a hood.)

EXAMPLE 4

Lithium Dispersion in Peneteck White Hydrocarbon Oil Using Carbon Dioxide as Dispersing Agent—Subsurface Feed Experiment No. 7505

The reactor and apparatus consisted of a 3 liter stainless steel round bottom flask with 4" (10.16 cm) opening, a 4" (10.16 cm) head with stirring shaft fixed therein, and connected to a high speed stirrer motor via a flexible shaft and a fixed Argon inlet and a ss sintered sparger disc and top and bottom heating mantles. The sparger disc (2½" [6.35 cm] biscuit type) was fixed directly below the cutting blade of the stirring shaft and was approximately ¾" (1.8 cm) off the bottom of reactor.

Lithium metal (350.0 grams of low sodium grade) was charged to the reactor in the dry atmosphere room. The reactor was assembled and 2.625 g of sodium and Peneteck hydrocarbon oil were added. The reactor was then heated to about 200° C. and the contents stirred gently until all metal was molten (approx. 30 minutes). Metal and oil were then stirred at high speed (10,000 rpm) for 4 minutes, then carbon dioxide was fed in through the sparger for a period of 2 minutes. Temperature of the reaction rose 11° C. (from 191°–202° C.) when the carbon dioxide was charged. At end of the carbon dioxide feed, stirring was stopped, the heating mantle was removed and the dispersion cooled to about 65° C. before transferring to tightly capped storage bottles.

Peneteck Hydrocarbon Oil is a white hydrocarbon oil manufactured by the Penreco Division of Pennzoil Products. It possesses a CST viscosity at 40° C. (ASTM D445) of 3.4/4.7 (43–59 pascal-sec) and a flash point (ASTM D92) of 129° C.

EXAMPLE 5

Secondary Butyllithium in Cyclohexane via Carbon Dioxide Dispersed Lithium Metal Experiment No. 7506

The reactor and apparatus consisted of a 500 ml Morton Cleaved 3 necked flask, y tube for additions, 125 ml dropping funnel, stirring shaft with teflon blade, stirring motor, and a thermometer probe with an electronic read out.

Lithium metal dispersion (prepared as in Example 1) was hexane washed two times and pentane washed twice and dried with Argon. The metal was then weighed and the experiment conducted using 10% excess lithium (14.42 g or 2.078 moles) using 395 milliliters of cyclohexane solvent.

Cyclohexane was used to transfer the lithium through a transfer tube to the reactor. Conditioner, 5 ml s-butyllithium cyclohexane, was added and the s-butyllithium in cyclohexane mixture stirred for 15–30 minutes. One to three mls of sec-butylchloride was added which raised the temperature from ambient to around 34° C. When the temperature peaked out and began to drop, a slow s-BuCl feed rate was started. sec-butylchloride was fed over one hour and forty-five minutes thereby adding a total of 87.4 g (0.944 moles) and the reaction temperature was maintained between 32°–37.0° C. by use of a hexane/dry ice bath.

The reaction was stirred for 1.5 hours before filtering.

The reaction mixture was filtered through a 500 ml medium fritted filter using approximately ¾" of inert diatomaceous earth filter aid. The solution filtered very fast (less than 5 minutes).

The final solution yield was 89.3%, C-bound lithium was 98.2% with less than 10 ppm chloride ion in solution.

Further examples are given in Table 4.

EXAMPLE 6

Sodium Dispersion in Peneteck Hydrocarbon Oil Using Carbon Dioxide as Dispersing Agent Experiment No. 7511

Into a 500 ml Morton Cleaved flask fitted with a high speed stirrer and gas inlet tube was placed 60 grams of sodium metal and 140 grams of Peneteck Hydrocarbon Oil. The contents of the flask was heated to 108° C. and stirred gently until all of the metal became molten. The mixture was then stirred at high speed (10,000 rpm) for 3–4 min. and the carbon dioxide gas feed begun. A total of 1.0 grams of carbon dioxide (1.7 wt % based on the metal) gas was fed into the mixture. The temperature of the reaction rose 3° C. within the first few seconds of the feed and then held constant for the remainder of the feed. Then, stirring was discontinued and the mixture cooled to room temperature. Part of the resulting dispersion was washed with hexane and pentane, then blown dry with argon to convert it to a dry, free-flowing powder. A small portion of the dry powder was placed on a watch glass in the hood. It did not ignite. It took approximately 10–15 min. before the powder turned white. The CFR 49 pyroforic solid test was negative. A photomicrograph of the solid dispersion showed particle sizes in the 1 to 200 micron range with most in the 50–100 micron range.

EXAMPLE 7

Preparation of n-butyllithium in Hexane via Carbon Dioxide Dispersed Lithium Metal Experiment No. 7851

The reactor and apparatus was as described in Example 5, plus heating mantle, and reflux condensor
Procedure The lithium metal dispersion prepared as in Example 1 was hexane washed twice and pentane washed once and dried with Argon. The metal was then weighed, 12.10 g (1.743 moles).

Hexane, 310 milliliters, was used to transfer the lithium through a transfer tube to the reactor. The hexane-lithium mixture was heated to reflux (Dry Ice/hexane in condensor) and dropwise feed of n-butyl chloride begun. The reaction proceeded instantaneously (heavy refluxing) and the source of heat was removed. Then 73.4 g of n-butylchloride (0.7924 moles) was fed in over a 40 minute period, the reaction heat controlled strictly by the rate of reflux. The reaction mixture was allowed to cool to ambient (stirring) over a 2.5 hour period. The mixture was filtered and the lithium chloride residue washed three times with hexane (50 ml each) over a 25–30 minute period. The combined filtrate and washings weighed 256.4 grams. A sample of the clear, water white (Pt/Co=<25 water white solution) product solution was assayed for total contained alkalinity and found to contain 2.94 meq/gram of solution 18.83 wt % n-butyllithium. The yield of n-butyllithium was 95.2%. Removal of the hexane solvent under vacuum gave a 97 wt % product which was clear and very pale yellow in color (Pt/Co=50 ASTM= D1209). Further examples are given in Table 4.

The above results can be compared to a similar run using a lithium dispersion prepared with oleic acid as a dispersant (experiment number 7813) where the resulting product solution was pale yellow (Pt/Co=175) and the concentrated product (97%) was bright yellow (Pt/CO=300) and the yield was 94.7%.

From the foregoing disclosure it is evident that it is possible, according to the invention, to produce a stable sodium metal powder formed by heating sodium metal in a hydrocarbon oil to a temperature above the melting point of the sodium metal, agitating the molten sodium, maintaining agitation under conditions sufficient to disperse the sodium metal into small molten particles while contacting the sodium metal with at least 0.3 weight percent of anhydrous carbon dioxide for at least one minute to disperse the molten sodium metal and recovering a stable coated sodium metal powder having particle sizes in the range of 10 to 300 microns in the form of a dry powder.

TABLE 1

USES OF LITHIUM DISPERSION MADE WITH CARBON DIOXIDE STABILIZER

| Lot No. | RLi | Init. Agent | % Yield | Remarks |
|---|---|---|---|---|
| 7224 | n-Butyl | none | 94.7 | Dry pack day 1 |
| 7231 | n-Butyl | none | 90.3 | Dry pack day 6 |
| 7253 | n-Butyl | none | 91.8 | Dry pack day 32 |
| 7261 | s-Butyl | none | 91.7 | Dry pack day 1 |
| 7262 | s-Butyl | none | 90.4 | Dry pack day 35 |
| 7292 | 2-Et Hexyl (heptane) | none | 42.5 | (a) |
| 7230 | t-Butyl (pentane) | 1 g sand per 9 Li | 73 | (b) |
| 7302 | Phenyl (DBE) | IPA | 94.1 | (c) |
| 7309 | LDA | none | 97.6 | (d) |
| 7288 | n-Hexyl | none | 88.3 | |

(a) Lithium dispersion prepared with oleic acid as dispersant did not initiate in heptane.
(b) Lithium dispersion prepared with oleic acid as dispersant gave an 80% yield.
(c) Run did not initiate on its own
(d) Reaction gave results equivalent to that using Lithium dispersion prepared from oleic acid.

TABLE 2

Effect of Carbon Dioxide Dispersed Lithium on Final Chloride Content of RLi in Hydrocarbon Solution

| Run No. | Alkyl-lithium | Li Dispersant (W %) | Yield % | Soluble Inorg. Cl. (ppm) |
|---|---|---|---|---|
| 7506 | SBL[1] | $CO_2$ (0.9) | 89.3 | <10 |
| 7515 | SBL | $CO_2$/5% Na | 88.5 | <11 |
| 7523 | SBL | $CO_2$ (1.3) | 87.8 | 33 |
| 7525 | SBL | $CO_2$ (2.6) | 89.6 | 41 |
| 7526 | SBL | $CO_2$ (3.9) | 84.2 | 46 |
| 7527 | NBL[2] | $CO_2$ (1.4) | 89.9 | 87 |
| 7529 | NBL | $CO_2$ (0.9) | 90.5 | 126 |
| 7530 | NBL | $CO_2$/5% Na | 83.8 | 58 |
| 7551 | NBL | $CO_2$ (3.2) | 87.5 | 193 |
| — | NBL | Oteic Acid (1.0) | — | 300[3] |

[1] Cyctohexane solvent
[2] Hexane solvent
[3] Typical value
SBL secondary butyllithium
NBL normal butyllithium

TABLE 3

LITHIUM/$CO_2$ DISPERSIONS IN PENETECK OIL

| EXPERIMENT NO. | REACTOR SIZE | PRE-CUT TIME (Min) | $CO_2$ % (WT)* | $CO_2$ FEED TIME (MIN) | (PARTICLE SIZE (microns) |
|---|---|---|---|---|---|
| 7174 | 500 ml 18 g Li | 3 | — | start to finish | 10–200 |
| 7179 | 500 ml 30 g Li | 3 | 5.2 | 2 | 20–300 |
| 7187 | 500 ml 30 g Li | 3 | 3.0 | 1 | 20–300 |
| 7218 | 3 l. 355 g Li | 4 | 1.8 | 3 | 10–200 |
| 7283 | 3 l. 300 g Li | 10 | 1.0 | 1 | 10–500 |
| 7285 | 3 l. 300 g Li | 5 | 2.0 | 4 | 10–200 |
| 7290 | 3 l. 300 g Li | 5 | 3.0 | 6 | 10–500 |
| 7291 | 500 ml 30 g Li | 9 | 1.0 | 0.5 | 20–300 |

TABLE 4

$CO_2$/LITHIUM DISPERSIONS IN PENETECK OIL

| | Dispersions | | | | | | Alkyllithiums | | | |
|---|---|---|---|---|---|---|---|---|---|---|
| Run No. | % $CO_2$ | $CO_2$ g/min | $CO_2$ Time (min.) | T (°C.) (feed) | Particle Size | Comments | Run No. | Type | Yield | Filter Rate ml/min |
| SURFACE FEED | | | | | | | | | | |
| 7283 | 1.29 | 3.87 | 1 | 11 | ≦200 | | 7523 | SBL | 87.8 | 100 |
| 7469 | 2.20 | 2.16 | 3 | 13 | 20–300 | | 7470 | SBL | 86.5 | 33 |
| 7285 | 2.58 | 1.94 | 4 | — | 20–300 | | 7525 | SBL | 89.6 | 250 |

TABLE 4-continued

CO$_2$/LITHIUM DISPERSIONS IN PENETECK OIL

| | Dispersions | | | | | | Alkyllithiums | | | |
|---|---|---|---|---|---|---|---|---|---|---|
| Run No. | % CO$_2$ | CO$_2$ g/min | CO$_2$ Time (min.) | T (°C.) (feed) | Particle Size | Comments | Run No. | Type | Yield | Filter Rate ml/min |
| 7430 | 3.16 | 5.16 | 2 | 68 | 50–100 | irregular shape | 7432 | SBL | didn't initiate | — |
| | | | | | | | 7445 | NBL | 89.3 | 63 |
| 7414[1] | 3.87 | 5.60 | 0.25 | 20 | 50–200 | irregular shape | 7428 | NBL | 89.2 | 3.3 |
| 7290 | 3.87 | 1.93 | 6 | 12 | 50–300 | round shape | 7526 | SBL | 84.2 | 100 |
| SUBSURFACE FEED | | | | | | | | | | |
| 7505 | 0.94 | 1.65 | 2 | 11 | ≦250 | | 7506 | SBL | 89.3 | 100 |
| 7513 | 1.01 | 1.52 | 2 | 9 | >200 | large | 7515 | SEL | 88.5 | 100 |
| 7497 | 1.41 | 1.65 | 3 | 13 | ≦150 | | 7500 | SBL | 87.8 | 100 |
| plant dispersion | — | — | — | — | ≦50 | — | 7473 | SBL | 89.5 | 100 |

[1] 0.5 liter run

What is claimed:

1. In the process for producing dispersions of alkali metals by heating an alkali metal selected from the group consisting of lithium, sodium and potassium in a hydrocarbon oil to produce a molten alkali metal-hydrocarbon oil mixture to produce a dispersion of the alkali metal in the hydrocarbon oil, the improvement which comprises contacting the mixture of molten alkali metal in hydrocarbon oil for at least one minute, while the mixture is being agitated under dispersion conditions, with at least 0.3 weight percent of anhydrous carbon dioxide, based on the weight of the metal, wherein the anhydrous carbon dioxide reacts with the molten alkali metal particles to form a dispersive coating around them.

2. The process of claim 1 wherein the carbon dioxide is introduced below the surface of the dispersion of molten alkali metal and hydrocarbon oil while the mixture is being agitated under dispersion conditions.

3. The process of claim 1 wherein the carbon dioxide is passed through the molten alkali metal-hydrocarbon oil mixture in an amount of between 1 and 3 weight percent based on the metal.

4. The process of claim 1 wherein the carbon dioxide passed through the dispersion is introduced below the surface of the dispersion in an amount of between 1 and 3 weight percent based on the weight of the metal.

* * * * *